United States Patent
Hrabak

(10) Patent No.: US 10,368,291 B2
(45) Date of Patent: Jul. 30, 2019

(54) CONTROLLING USE OF VEHICULAR WI-FI HOTSPOTS BY A HANDHELD WIRELESS DEVICE

(71) Applicant: GM GLOBAL TECHNOLOGY OPERATIONS LLC, Detroit, MI (US)

(72) Inventor: Robert A. Hrabak, Birmingham, MI (US)

(73) Assignee: GM Global Technology Operations LLC, Detroit, MI (US)

(*) Notice: Subject to any disclaimer, the term of this patent is extended or adjusted under 35 U.S.C. 154(b) by 149 days.

(21) Appl. No.: 15/365,750

(22) Filed: Nov. 30, 2016

(65) Prior Publication Data

US 2018/0152880 A1 May 31, 2018

(51) Int. Cl.
| | |
|---|---|
| *H04W 4/48* | (2018.01) |
| *H04W 4/80* | (2018.01) |
| *H04L 29/08* | (2006.01) |
| *H04L 29/12* | (2006.01) |
| *H04W 48/02* | (2009.01) |
| *H04W 76/11* | (2018.01) |
| *H04W 84/00* | (2009.01) |

(52) U.S. Cl.
CPC ......... *H04W 48/02* (2013.01); *H04L 67/1097* (2013.01); *H04W 4/48* (2018.02); *H04W 4/80* (2018.02); *H04W 76/11* (2018.02); *H04L 61/6022* (2013.01); *H04L 67/18* (2013.01); *H04W 84/005* (2013.01)

(58) Field of Classification Search
CPC ....... H04W 48/02; H04W 4/00; H04W 76/11; H04W 4/008; H04W 4/80; H04W 76/021; H04W 84/005; H04L 29/08; H04L 29/12; H04L 61/6022; H04L 67/1097
See application file for complete search history.

(56) References Cited

U.S. PATENT DOCUMENTS

| | | | | |
|---|---|---|---|---|
| 2015/0063329 | A1* | 3/2015 | Frye | H04W 48/02 370/338 |
| 2015/0222553 | A1* | 8/2015 | Macdonald | H04W 76/10 370/230.1 |
| 2016/0323796 | A1* | 11/2016 | Richter | H04W 36/32 |
| 2017/0367142 | A1* | 12/2017 | Son | H04L 67/12 |

* cited by examiner

*Primary Examiner* — Charles C Jiang
*Assistant Examiner* — Kyaw Z Soe
(74) *Attorney, Agent, or Firm* — Reising Ethington P.C.; David Willoughby

(57) ABSTRACT

A system and method of controlling use of vehicular Wi-Fi hotspots by a handheld wireless device includes: detecting that the handheld wireless device is communicating via a Wi-Fi hotspot; determining at the handheld wireless device that that the Wi-Fi hotspot is provided by a vehicle; and enabling one or more default prohibitions against transmitting low-priority data from the handheld wireless device via a cellular wireless carrier system while the handheld wireless device communicates with the Wi-Fi hotspot provided by the vehicle.

20 Claims, 2 Drawing Sheets

CONTROLLING USE OF VEHICULAR WI-FI HOTSPOTS BY A HANDHELD WIRELESS DEVICE

INTRODUCTION

The present invention relates to wireless communications and, more particularly, to controlling the use of vehicular Wi-Fi hotspots by a handheld wireless device.

Modern vehicles increasingly include functionality that allows handheld wireless devices to access the Internet. The vehicles can offer this functionality using vehicle telematics units that provide a short-range wireless access point for handheld wireless devices. These short-range wireless access points are commonly referred to as "Wi-Fi hotspots" that handheld wireless devices can access to wirelessly communicate packetized data with the Internet. The Wi-Fi hotspots involve short-range wireless data communications between the handheld wireless devices and the vehicle. The vehicle can communicate the short-range wireless data communications it receives from the handheld wireless device to the Internet via a cellular wireless carrier system. And data from the Internet that is addressed to handheld wireless devices can be received at the vehicle from the Internet via the wireless carrier system at the vehicle and transmitted to the handheld wireless devices using short-range wireless data communications.

But in addition to the ability to access the Internet using a Wi-Fi hotspot, the handheld wireless devices may also include the ability to communicate voice and data using a wireless carrier system carrying out cellular communications. Each of the Wi-Fi hotspot and the cellular wireless carrier system can be considered a communications channel for accessing the Internet at the handheld wireless device. Given the ability to communicate data via a Wi-Fi hotspot or a cellular wireless carrier system, the handheld wireless devices generally include instructions to prefer the Wi-Fi hotspot over the cellular wireless carrier system when Wi-Fi is available. This preference can reduce the data transmission costs often associated with cellular data transmissions. However, there are conditions in which the default selection of Wi-Fi is undesirable and it would be helpful to control the use of a vehicular Wi-Fi hotspot by the handheld wireless devices.

SUMMARY

According to an embodiment, there is provided a method of controlling use of vehicular Wi-Fi hotspots by a handheld wireless device. The method includes detecting that the handheld wireless device is communicating via a Wi-Fi hotspot; determining at the handheld wireless device that that the Wi-Fi hotspot is provided by a vehicle; and enabling one or more default prohibitions against transmitting low-priority data from the handheld wireless device via a cellular wireless carrier system while the handheld wireless device communicates with the Wi-Fi hotspot provided by the vehicle.

According to another embodiment, there is provided a method of controlling use of vehicular Wi-Fi hotspots by a handheld wireless device. The method includes detecting that the handheld wireless device is communicating via a Wi-Fi hotspot; receiving an identifier of the Wi-Fi hotspot; comparing the received identifier with content of a database containing vehicular Wi-Fi identifiers; identifying the received identifier in the database containing vehicular Wi-Fi identifiers; and enabling one or more default prohibitions against transmitting low-priority data from the handheld wireless device via a cellular wireless carrier system while the handheld wireless device communicates with the Wi-Fi hotspot provided by the vehicle.

According to yet another embodiment, there is provided a method of controlling use of vehicular Wi-Fi hotspots by a handheld wireless device. The method includes detecting that the handheld wireless device is communicating via a Wi-Fi hotspot; determining that the handheld wireless device is located in a vehicle; and enabling one or more default prohibitions against transmitting low-priority data from the handheld wireless device via a cellular wireless carrier system while the handheld wireless device communicates with the Wi-Fi hotspot provided by the vehicle.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Figure 1:
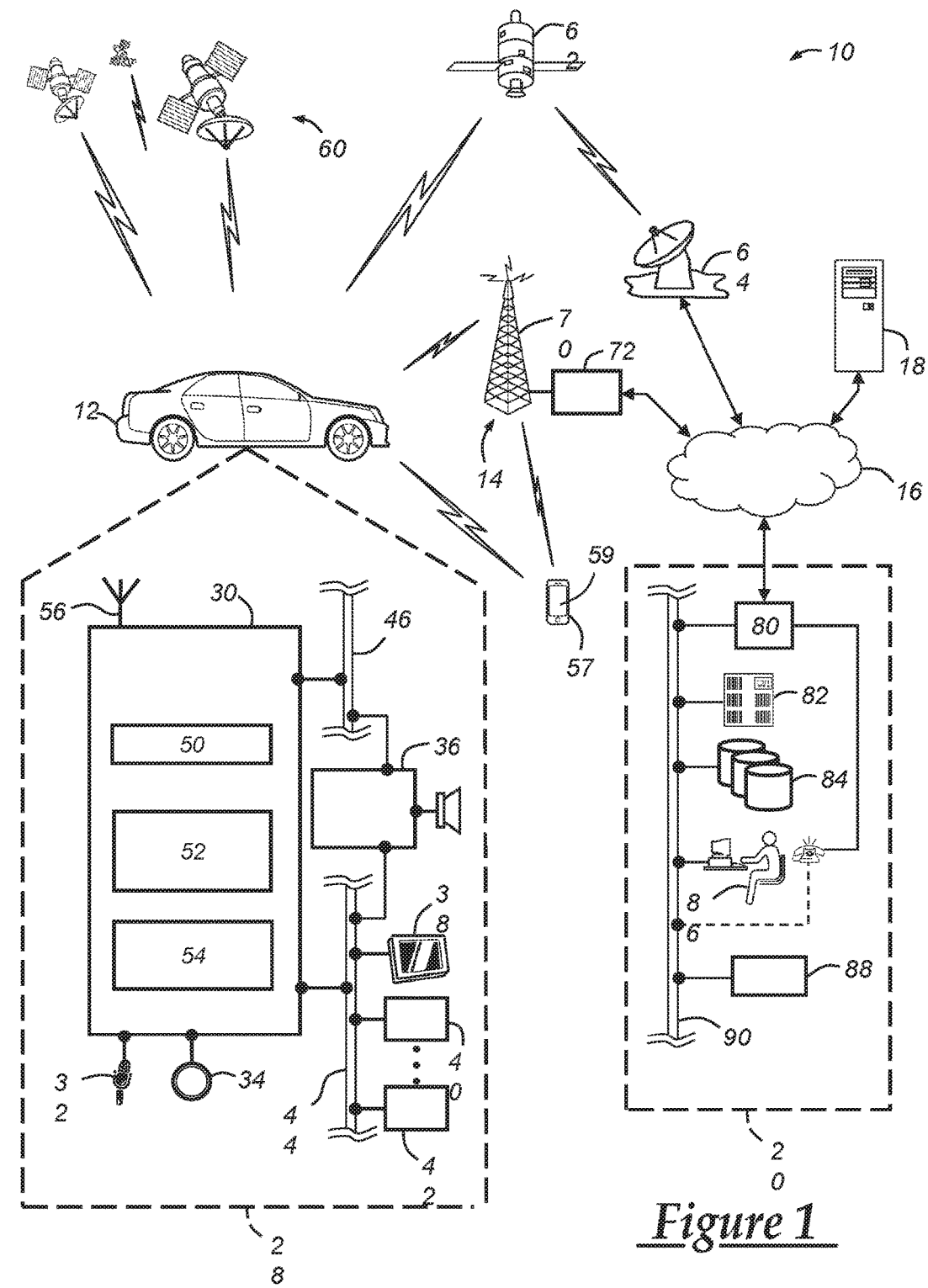
FIG. 1 is a block diagram depicting an embodiment of a communications system that is capable of utilizing the method disclosed herein.

The system and method below controls the selection of a communications channel by a handheld wireless device based on the availability of a Wi-Fi hotspot provided by a vehicle. Handheld wireless devices having the capability to communicate voice and/or data via a cellular wireless carrier system or a short-range wireless communications protocol, such as via a Wi-Fi hotspot, are often programmed to select the short-range wireless communications protocol when it is available. When the handheld wireless devices are located in a fixed structure, such as a residence or a commercial building, communicating data via the short-range wireless communications protocol can be less costly than doing so using the cellular wireless carrier system because it generally does not incur data air time costs. The fixed Wi-Fi hotspot is wired to the Internet via a land network that communicates data without using the cellular wireless carrier system. In contrast, cellular wireless carrier systems may charge for wirelessly transmitting data, usually by the quantity of data communicated. The handheld wireless devices are programmed with default settings to prefer the Wi-Fi hotspot and its cost-free data communications over the fee-based cellular wireless carrier system.

Given the choice between these two communications channels, the handheld wireless devices limit the type of data communications they allow when only the cellular wireless carrier system is available. The handheld wireless device may designate software applications or data generated by particular software applications as low-priority to be sent only when a short-range wireless communications protocol is available. For example, software applications may transmit queries in the form of packetized data to remote servers requesting any available software updates. However, when the short-range wireless communications protocol is not available, the handheld wireless devices may prevent transmission of low-priority data or limit data transmissions to applications or actions that are initiated by a user of the device.

Vehicular Wi-Fi hot spots differ from Wi-Fi hotspots that are fixed because they communicate data using the cellular wireless carrier system rather than a wired land network. Instead of offering a cost-free communication channel as exists with fixed Wi-Fi hotspots, the vehicular Wi-Fi hotspots may incur data air time costs for sending data over the cellular wireless carrier system. And these cost may be passed on to users of the handheld wireless communications devices.

Default settings of the handheld wireless device preferring Wi-Fi and allowing the communication of low-priority data can be modified using a software application resident on the handheld wireless device that determines whether it is located in a vehicle or otherwise is in communication with a vehicular Wi-Fi hotspot. When it is determined that the handheld wireless device is communicating with a vehicular Wi-Fi hotspot, the software application can direct the device to limit or stop communicating low-priority or non-user-initiated data via the vehicular Wi-Fi hotspot. This application can prevent handheld wireless devices from using their default settings to communicate low-priority data via the vehicular Wi-Fi hotspot and unexpectedly incur data airtime costs.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking, collectively referred to as a carrier network. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM, CDMA, or LTE standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as LTE, EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, including short range wireless communication (SRWC) such as any of the IEEE 802.11 protocols (Wi-Fi), WiMAX, ZigBee™, Wi-Fi direct, Bluetooth, or near field communication (NFC). Communications using these types of short-range wireless communications protocols can also be referred to generically herein as a "Wi-Fi hotspot." When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device, such as a smart phone 57. The smart phone 57 can include computer processing capability, a transceiver capable of communicating using one or more of the short-range wireless protocols discussed above, and a visual smart phone display 59. In some implementations, the smart phone display 59 also includes a touch-screen graphical user interface. The smart phone 57 can also include a GPS module capable of receiving GPS satellite signals and generating GPS coordinates based on those signals. The smart phone 57 also includes one or more microprocessors that execute machine code to generate logical output. Examples of the smart phone 57 include the iPhone manufactured by Apple and the Galaxy manufactured by Samsung, as well as others.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Cellular wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Method—

Figure 2:
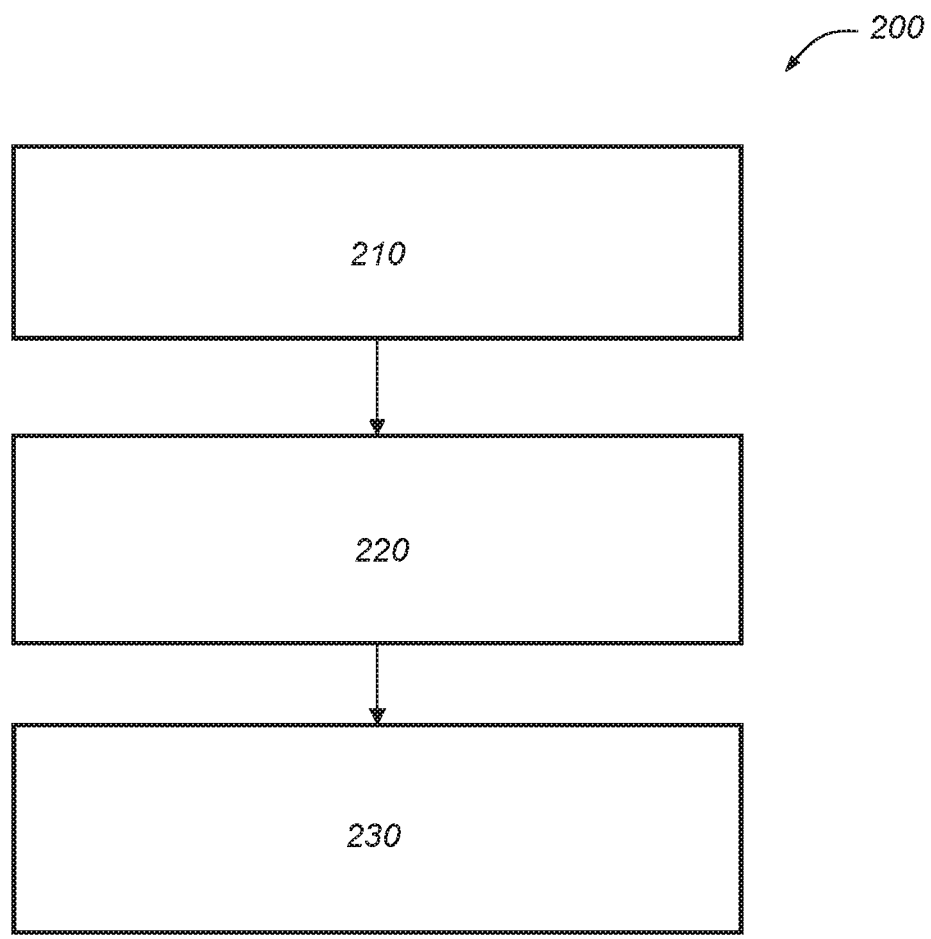
FIG. 2 is a flow chart depicting an implementation of a method of controlling use of vehicular Wi-Fi hotspots by a handheld wireless device.

Turning now to FIG. 2, an embodiment of a method (200) of controlling use of vehicular Wi-Fi hotspots by the smart phone 57 is shown. The method 200 begins at step 210 by detecting the smart phone 57 communicating via a Wi-Fi hotspot. The smart phone 57 can periodically perform a scan to identify the communications channels available to it. This scan can be carried out in response to a currently-used communication channel becoming no longer available or after a predetermined amount of time has passed. Either way, the smart phone 57 can identify the existence of one or more cellular wireless carrier networks, one or more Wi-Fi hotspots, or both. After identifying all of the available communication channels, the smart phone 57 accesses machine or computer-readable instructions that prioritize the communication channels in order of most-desirable to least desirable. The smart phone 57 can then select the most-desirable communication channel. If the smart phone 57 successfully communicates with or through the most-desirable communication channel, the smart phone 57 can stop the scan. Otherwise, the smart phone 57 selects the next most desirable communication channel on the list and attempt communications and continue this process until the smart phone 57 successfully establishes a data connection. The smart phone 57 can include a default instruction classifying communication channels that are Wi-Fi hotspots to be more desirable than cellular wireless carrier systems. That is, when a Wi-Fi hotspot is available as a result of the scan, it may be preferred relative to an available cellular wireless carrier system. In addition, the default instruction can also command the smart phone 57 to determine if it is communicating via a cellular wireless carrier system and, if so, stop communicating with the cellular wireless carrier system when a Wi-Fi hotspot is determined to be available. The method 200 proceeds to step 220.

At step 220, the smart phone 57 detects that that the Wi-Fi hotspot is provided by the vehicle 12. After determining the existence of an available Wi-Fi hotspot, the smart phone 57 can then identify the Wi-Fi hotspot as a vehicular Wi-Fi hotspot rather than a fixed Wi-Fi hotspot. And the smart phone 57 can make this determination in any one of a variety of ways. In one implementation, the smart phone 57 can receive a vehicle identifier from the Wi-Fi hotspot. For instance, the vehicle 12 can provide the Wi-Fi hotspot to the smart phone 57 and, as part of the initial communications between the vehicle 12 and the smart phone 57, transmit a vehicle identification number (VIN) to the smart phone 57. The smart phone 57 can recognize the VIN not by its content but rather as having the particular format of the VIN and conclude that the Wi-Fi hotspot is hosted by the vehicle 12.

Other implementations can include receiving a Media Access Control (MAC) address at the smart phone 57 from the Wi-Fi hotspot, which identifies the device providing the Wi-Fi hotspot. The smart phone 57 can then access the content of a database having MAC addresses that are known to identify vehicular Wi-Fi hotspots. The smart phone 57 can search the database to determine whether or not the received MAC address is found among MAC addresses known to identify vehicular Wi-Fi hotspots. If so, the smart phone 57 can determine that the Wi-Fi hotspot it currently is communicating with is provided by the vehicle 12. Otherwise, the smart phone 57 can conclude that that Wi-Fi hotspot is fixed. The database containing MAC addresses identifying vehicular Wi-Fi hotspots can be stored at the smart phone 57 in some implementations. However, it is also possible for the smart phone 57 to wirelessly send the MAC address it receives from the Wi-Fi hotspot to a central facility, such as the computer 18 or the call center 20, where the central facility maintains the database containing MAC addresses identifying vehicular Wi-Fi hotspots. There, the central facility can determine whether or not the MAC address it receives from the smart phone 57 is included in the database and then transmit a response to the smart phone 57 indicating the outcome of the determination. The received MAC address could be sent from the smart phone 57 to the central facility via the cellular wireless carrier system 14 or the smart phone 57 could use the Wi-Fi hotspot itself.

It is also possible to determine that the Wi-Fi hotspot is provided by the vehicle 12 using the Service Set Identification (SSID) broadcast by the Wi-Fi hotspot. The SSID can include clues indicating whether or not the Wi-Fi hotspot providing the SSID is located on the vehicle 12. For example, the SSID can include the word "vehicle" or the name of a vehicle manufacturer. The smart phone 57 can access a database that contains words or word segments that are commonly associated with a vehicular Wi-Fi hotspot. After comparing the entire SSID or a portion of the SSID with the contents of the database including words commonly associated with a vehicular Wi-Fi hotspot, the smart phone 57 can determine a whether the SSID includes vehicle-related words. If so, the smart phone 57 can determine that the Wi-Fi hotspot is provided by the vehicle 12.

The smart phone 57 can be programmed to determine that it is located within or in close proximity to the vehicle 12 at the same time the smart phone 57 is communicating via a Wi-Fi hotspot. When each of these determinations occur, the smart phone 57 can conclude that the Wi-Fi hotspot is provided by the vehicle 12. For example, the smart phone 57 can be paired with the vehicle 12 using Bluetooth as well as carrying out short-range wireless communications with a Wi-Fi hotspot provided by the vehicle 12. The smart phone 57 can monitor the status of its Bluetooth connection with the vehicle 12 to determine that the smart phone 57 is located in the vehicle 12. At the same time, the smart phone 57 can detect that the smart phone 57 is communicating via Wi-Fi and use the existence of a vehicular Bluetooth connection to determine that the Wi-Fi hotspot is vehicular.

The smart phone 57 can carry out this and other functionality by executing or otherwise operating at the direction of a software application that has been obtained from a remotely-located software application repository. These repositories may informally be called "App Stores" and many manufacturers of handheld wireless devices operate their own repositories, such as the "App Store" operated by Apple™. The method 200 proceeds to step 230.

At step 230, the smart phone 57 enables one or more default prohibitions or instructions against transmitting low-priority data from the smart phone 57 via the cellular wireless carrier system 14 while the smart phone 57 communicates with the Wi-Fi hotspot provided by the vehicle 12. The smart phone 57 can identify one or more software applications or types of data the smart phone 57 wirelessly transmits, or both as being low-priority. This means that the time at which this low-priority data is sent is not vital for the smart phone 57 to successfully provide service to a user. The smart phone 57 can include one or more default prohibitions that prevent wireless transmission of low-priority data when a Wi-Fi hotspot is unavailable. And the smart phone 57 deactivates the default prohibitions when it successfully communicates with a fixed Wi-Fi hotspot. However, after determining that the Wi-Fi hotspot is provided by a vehicle, the smart phone 57 can reactivate the default prohibitions that prevent wireless transmission of low-priority data.

The low-priority data generally includes data transmissions that have not been initiated by a user of the smart phone 57. Or the smart phone 57 can identify background data transmissions that involve updating software or backing up user files stored locally at the smart phone 57 with a cloud-based server storage service (e.g., iCloud™) and label this data as having a low-priority. When the smart phone 57 is communicating with a vehicular Wi-Fi hotspot, the low-priority data that normally would be wirelessly transmitted via a fixed Wi-Fi hotspot can be prevented from being sent due to the smart phone 57 activating the default prohibition that in the past would not have been active during Wi-Fi communications. The smart phone 57 can periodically perform a scan of the possible communications channels and deactivate the default prohibitions when the smart phone 57 begins communicating with a fixed Wi-Fi hotspot. The method 200 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of controlling use of vehicular Wi-Fi hotspots by a handheld wireless device, comprising the steps of:
   (a) detecting that the handheld wireless device is communicating via a Wi-Fi hotspot;
   (b) determining at the handheld wireless device that the Wi-Fi hotspot is provided by a vehicle, including:

(b1) comparing a received identifier of the Wi-Fi hotspot with content of a database containing vehicular Wi-Fi identifiers; and
(b2) identifying the received identifier in the database containing vehicular Wi-Fi identifiers; and
(c) enabling one or more default prohibitions against transmitting low-priority data from the handheld wireless device to a remote server via the Wi-Fi hotspot provided by the vehicle and a cellular wireless carrier system to which the vehicle is connected while the handheld wireless device communicates with the Wi-Fi hotspot provided by the vehicle.

2. The method of claim 1, wherein the received identifier is a vehicle identifier, and wherein step (b) further comprises receiving the vehicle identifier from the Wi-Fi hotspot.

3. The method of claim 1, wherein step (b) further comprises receiving a Service Set Identifier (SSID) from the Wi-Fi hotspot.

4. The method of claim 1, wherein step (b) further comprises receiving a Media Access Control (MAC) address from the Wi-Fi hotspot.

5. The method of claim 1, wherein the low-priority data is determined to have not been created at the direction of a user of the handheld wireless device.

6. The method of claim 1, wherein the low-priority data comprises data to be sent to a cloud-based server storage service hosted at the remote server.

7. The method of claim 1, wherein the handheld wireless device comprises a smart phone.

8. A method of controlling use of vehicular Wi-Fi hotspots by a handheld wireless device, comprising the steps of:
(a) detecting that the handheld wireless device is communicating via a Wi-Fi hotspot;
(b) receiving an identifier of the Wi-Fi hotspot;
(c) comparing the received identifier with content of a database containing vehicular Wi-Fi identifiers;
(d) identifying the received identifier in the database containing vehicular Wi-Fi identifiers; and
(e) enabling one or more default prohibitions against transmitting low-priority data from the handheld wireless device via a cellular wireless carrier system while the handheld wireless device communicates with the Wi-Fi hotspot provided by a vehicle.

9. The method of claim 8, wherein the received identifier further comprises a vehicle identifier received from the Wi-Fi hotspot.

10. The method of claim 8, wherein the received identifier further comprises an (SSID) received from the Wi-Fi hotspot.

11. The method of claim 8, wherein the received identifier further comprises a Media Access Control (MAC) address received from the Wi-Fi hotspot.

12. The method of claim 8, wherein the low-priority data is determined to have not been created at the direction of a user of the handheld wireless device.

13. The method of claim 8, wherein the low-priority data comprises data to be sent to a cloud-based server storage service.

14. The method of claim 8, wherein the handheld wireless device comprises a smart phone.

15. A method of controlling use of vehicular Wi-Fi hotspots by a handheld wireless device, comprising the steps of:
(a) detecting that the handheld wireless device is communicating via a Wi-Fi hotspot;
(b) determining that the handheld wireless device is located in a vehicle, including:
(b1) comparing a received identifier of the Wi-Fi hotspot with content of a database containing vehicular Wi-Fi identifiers; and
(b2) identifying the received identifier in the database containing vehicular Wi-Fi identifiers; and
(c) enabling one or more default prohibitions against transmitting low-priority data from the handheld wireless device via the Wi-Fi hotspot and a cellular wireless carrier system while the handheld wireless device communicates with the Wi-Fi hotspot provided by the vehicle so that the low-priority data is inhibited from being transmitted to a remote server via the Wi-Fi hotspot and a cellular connection between the vehicle and the cellular wireless carrier system.

16. The method of claim 15, wherein step (b) further comprises detecting the presence of an additional short-range wireless communications link between the handheld wireless device and the vehicle.

17. The method of claim 15, wherein the low-priority data is determined to have not been created at the direction of a user of the handheld wireless device.

18. The method of claim 15, wherein the low-priority data comprises data to be sent to a cloud-based server storage service hosted at the remote server.

19. The method of claim 15, wherein the handheld wireless device comprises a smart phone.

20. The method of claim 1, wherein the received identifier is at least one of (1) a vehicle identifier, (2) transmitted by the WiiFi hotspot, (3) a Service Set Identifier, (4) a Media Access Control (MAC) address, or (5) a vehicular connection of the handheld device separate from the Wi-Fi hotspot.

* * * * *